Feb. 5, 1946.　　　O. M. FOX ET AL　　　2,394,298
SEALING MEANS FOR SOAKING PIT COVERS OR THE LIKE
Filed Aug. 17, 1944　　　6 Sheets-Sheet 1
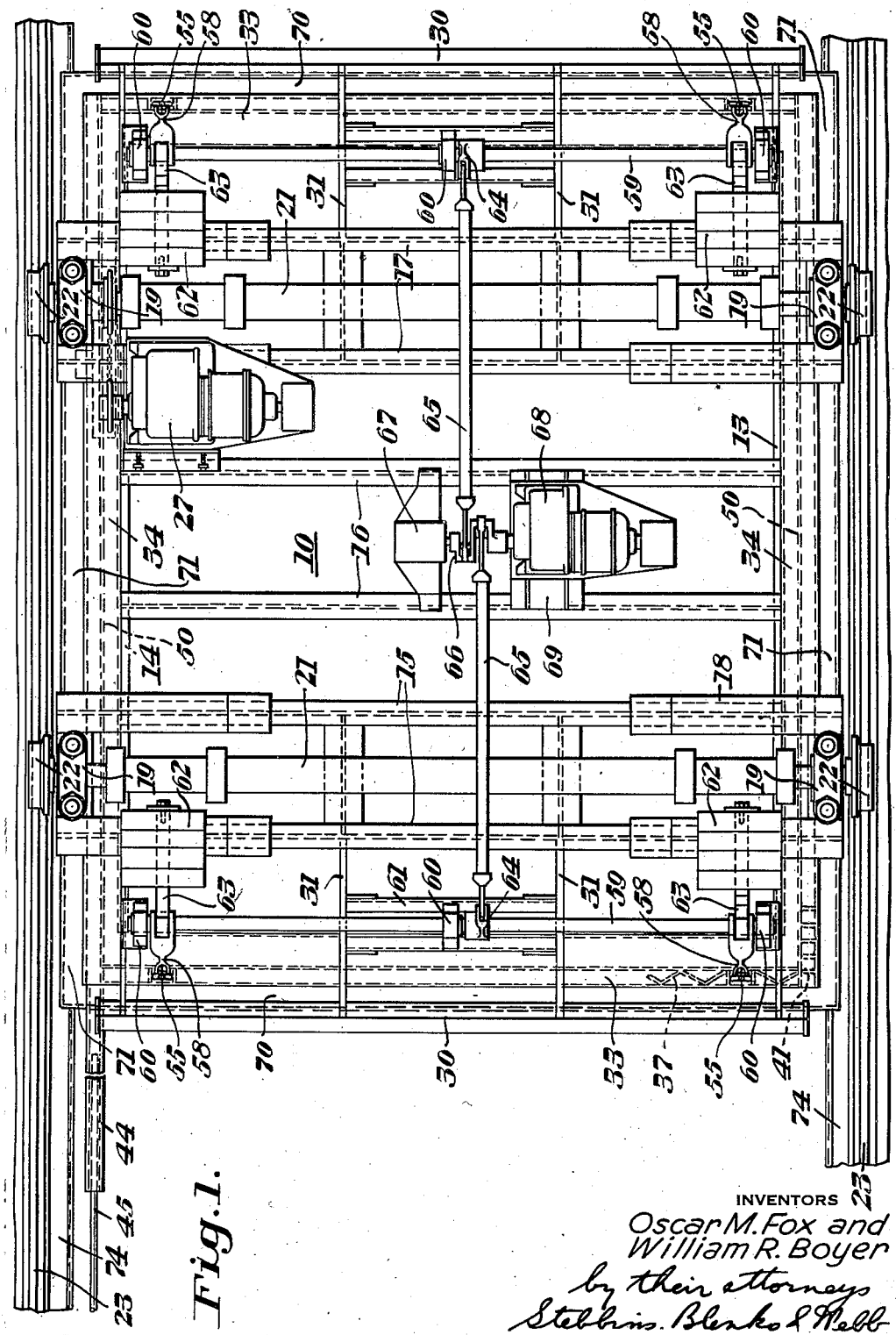
Fig.1.
INVENTORS
Oscar M. Fox and
William R. Boyer

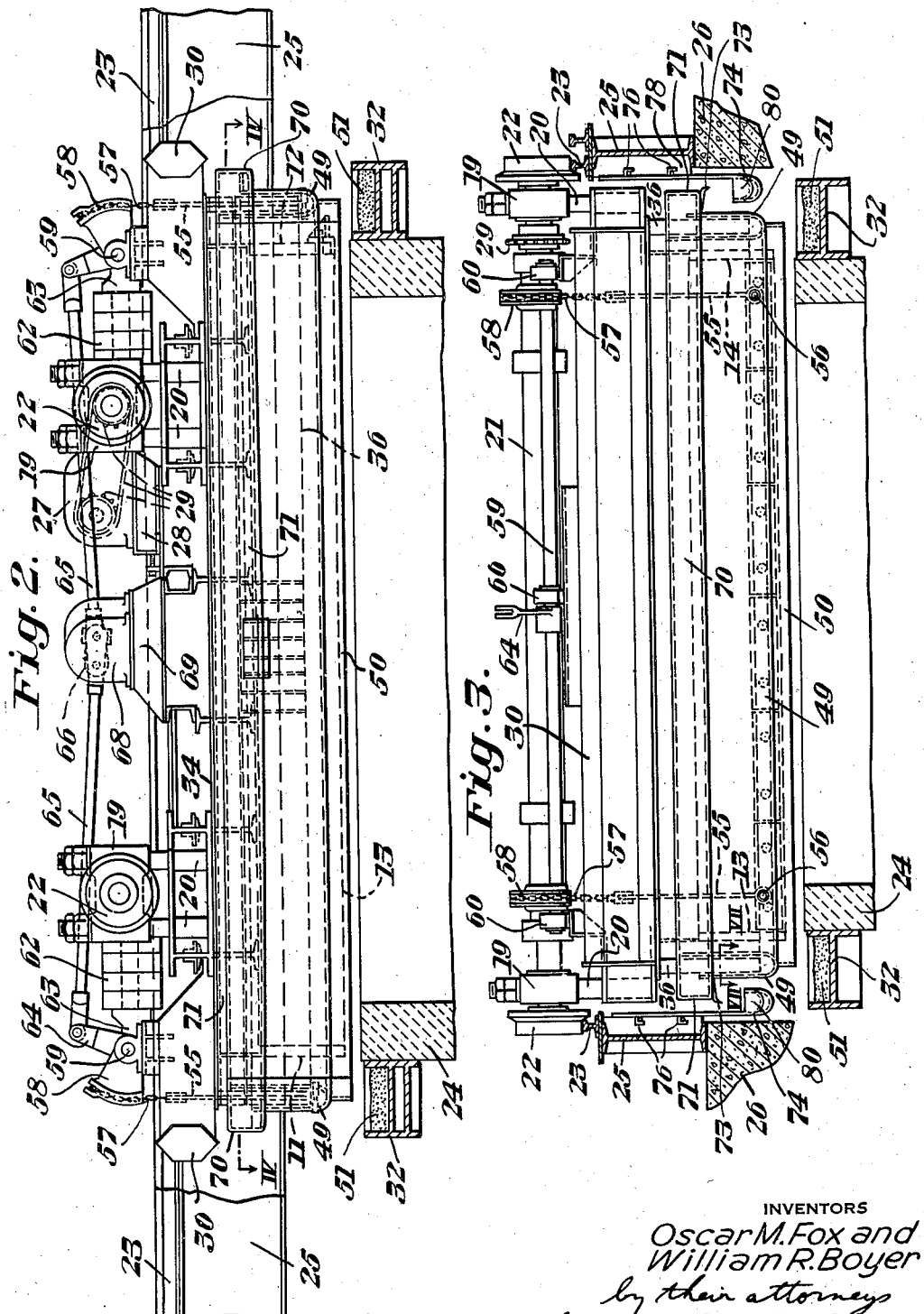

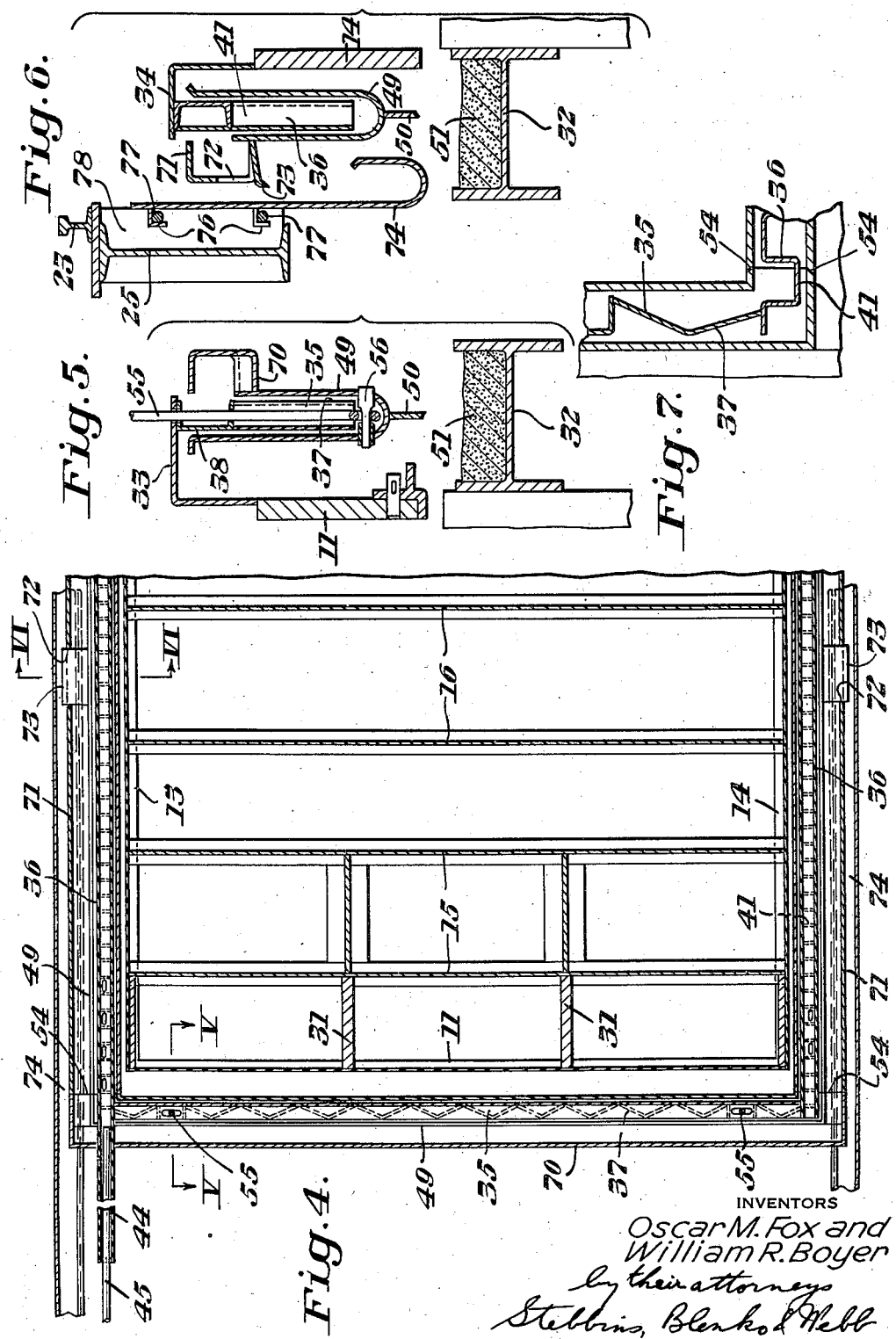

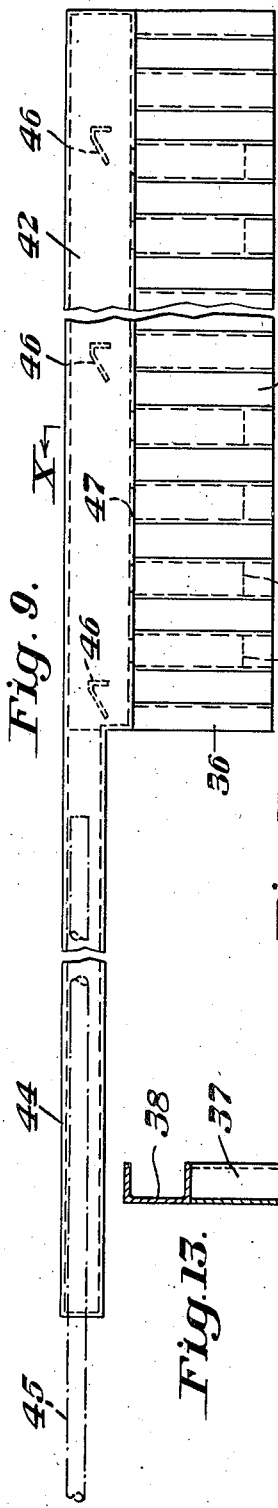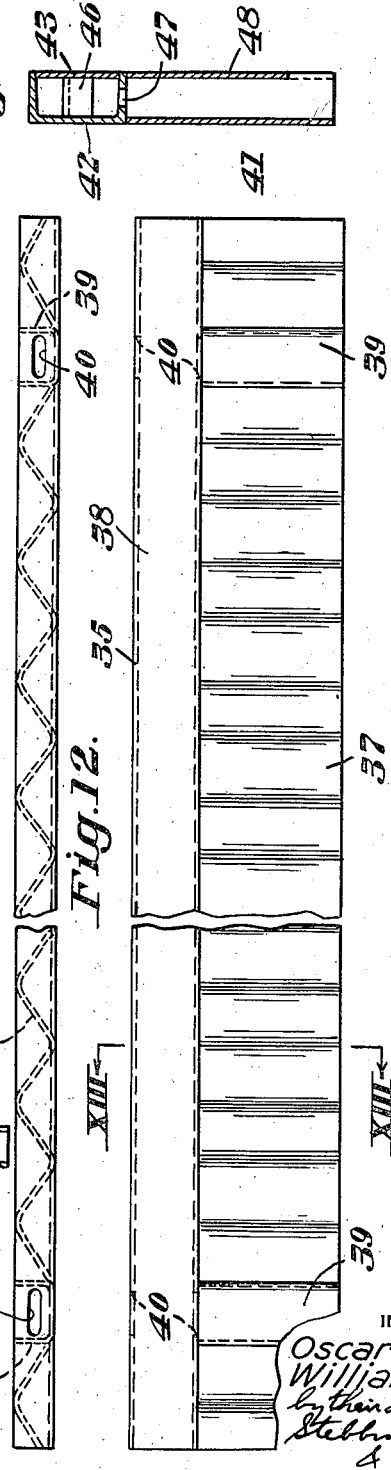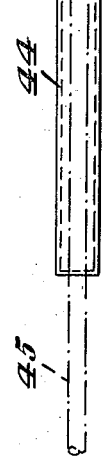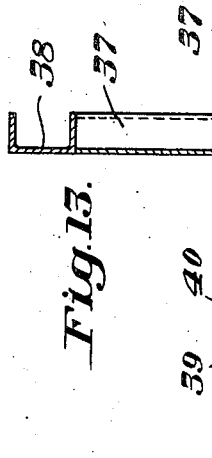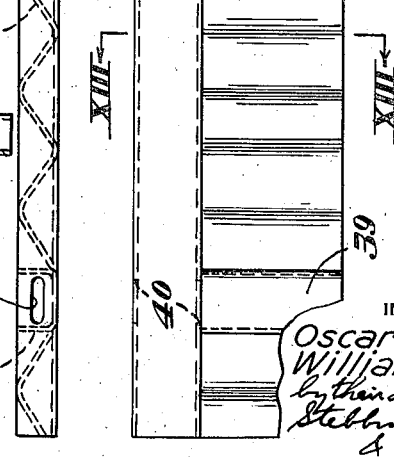

Feb. 5, 1946.   O. M. FOX ET AL   2,394,298
SEALING MEANS FOR SOAKING PIT COVERS OR THE LIKE
Filed Aug. 17, 1944   6 Sheets-Sheet 5
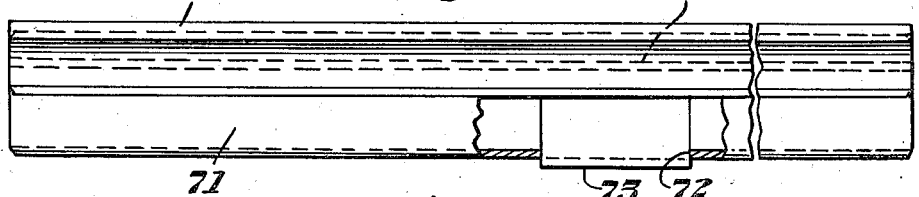
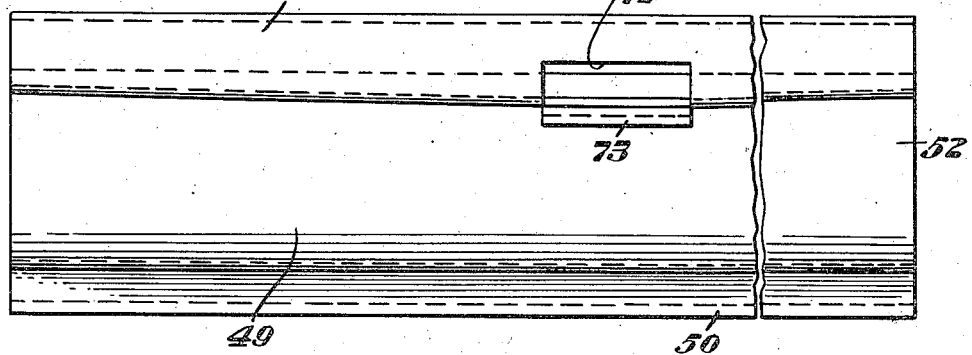
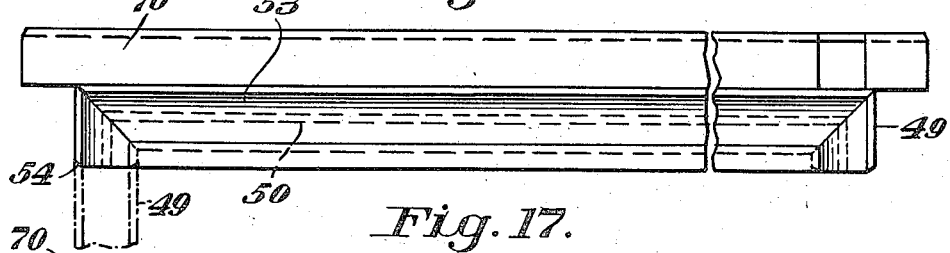
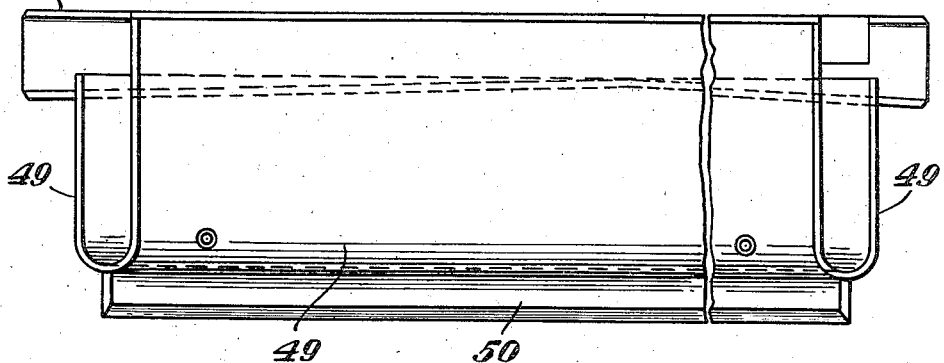
INVENTORS
Oscar M. Fox and
William R. Boyer
by their attorneys
Stebbins, Blenko & Webb Feb. 5, 1946.    O. M. FOX ET AL    2,394,298
SEALING MEANS FOR SOAKING PIT COVERS OR THE LIKE
Filed Aug. 17, 1944    6 Sheets-Sheet 6
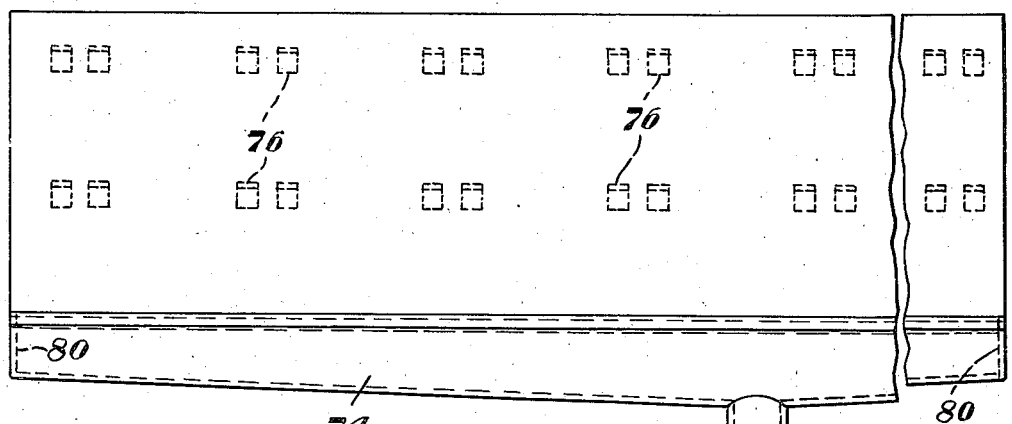
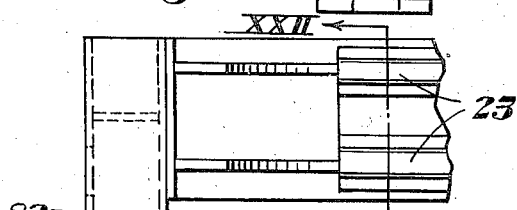
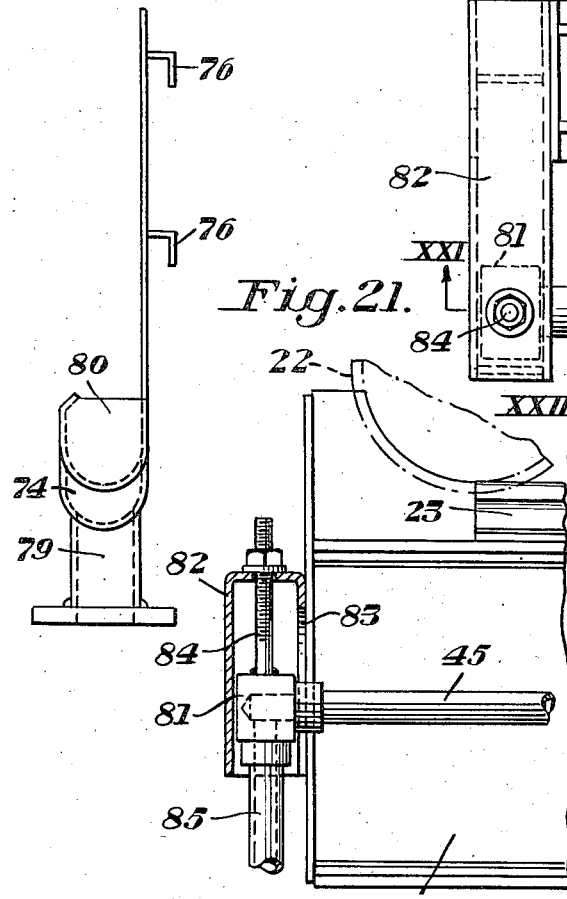
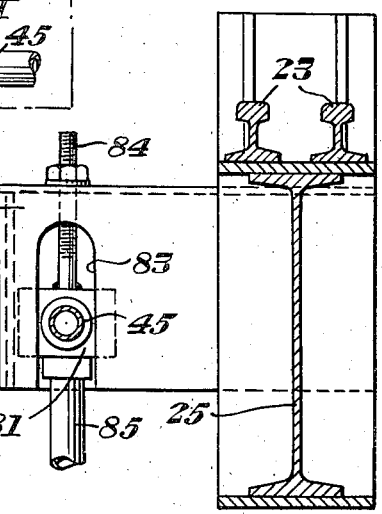
INVENTORS
Oscar M. Fox and
William R. Boyer
by their attorneys
Stebbins, Blenko & Webb Patented Feb. 5, 1946

2,394,298

UNITED STATES PATENT OFFICE 2,394,298

SEALING MEANS FOR SOAKING PIT COVERS OR THE LIKE

Oscar M. Fox, Pittsburgh, and William R. Boyer, Oakmont, Pa., assignors to Blaw-Knox Company, Pittsburgh, Pa., a corporation of New Jersey Application August 17, 1944, Serial No. 549,950

14 Claims. (Cl. 110—173)

This invention relates generally to covers for soaking pits or the like and, in particular, to means for sealing the space between the cover and the wall of the pit proper.

Croft Patent 2,189,280 discloses in Figure 6 a soaking pit cover adapted to travel parallel to its sides from a position over a soaking pit to a position laterally thereof. Provision is made for sealing the space between the cover and wall of the pit without vertical movement of the cover. Our invention is an improvement on the structure of the patent, the object thereof being to provide sealing means of such character as to avoid difficulty in keeping the sealing channel filled with sand and also channeling, as well as to provide improved protection against overheating or burning of the sealing means.

In a preferred embodiment of our invention, we provide a sealing means comprising fixed curtains depending from the sides and ends of the cover, and movable curtains comprising troughs into which the fixed curtains extend, the troughs having a flange or bottom strip adapted to penetrate granular material, such as sand, in the usual sealing channel along the sides and ends of the pit. We provide means for circulating water through the trough and maintaining a depth of water therein sufficient to remain in sealing relation to the fixed curtains when the movable curtains are lowered relative thereto. We also provide a telescoping connection for supplying water to the trough throughout the movement of the cover from closed to open position. The water overflows from the trough into a duct which is continuous around the sides and ends of the cover. The sides are provided with outlets which discharge into gutters extending along the path traversed by the outlets in the movement of the cover.

Further details, novel features and advantages of our invention will become apparent during the following complete description thereof which refers to the accompanying drawings illustrating a preferred embodiment. In the drawings, Figure 1 is a plan view;

Figure 2 is a side elevation showing a portion of the pit wall in section, the rails on which the cover travels and their supports being broken away;

Figure 3 is an end elevation which also shows the pit walls in section, certain parts of the apparatus being omitted;

Figure 4 is a partial section along the plane of line IV—IV of Figure 2;

Figures 5 and 6 are partial sections taken along planes of lines V—V and VI—VI, respectively, of Figure 4;

Figure 7 is a partial section taken along the plane of line VII—VII of Figure 3;

Figure 8 is a plan view of one of the fixed side curtains;

Figure 9 is an elevation thereof;

Figure 10 is a vertical section therethrough along the plane of line X—X of Figure 9;

Figure 11 is a plan view of one of the fixed end curtains;

Figure 12 is an elevation thereof;

Figure 13 is a vertical section therethrough along the plane of line XIII—XIII of Figure 12;

Figure 14 is a plan view of the movable curtain or trough at the sides of the cover;

Figure 15 is an elevation thereof;

Figure 16 is a plan view of the trough or movable curtain at the ends of the cover;

Figure 17 is an elevation thereof;

Figure 18 is an elevation of one of the gutters;

Figure 19 is an end view thereof;

Figure 20 is a plan view of a water-supply connection adapted to extend into one of the fixed side curtains;

Figure 21 is a sectional elevation taken along the plane of line XXI—XXI of Figure 20; and Figure 22 is a sectional view taken along the plane of line XXII—XXII of Figure 20.

Referring in detail to the drawings, the cover proper indicated generally at 10 is defined by end walls 11 and 12 and side walls 13 and 14 of heavy plate. Crossbeams 15, 16 and 17 extend between the side walls.

Short lengths of I-beams 18 are secured to the beams 15 and 17 and extend outwardly beyond the side walls 13 and 14 to provide overhanging brackets for supporting bearings 19. The bearings are carried on posts 20 extending upwardly from the brackets 18. Axles 21 journaled in the bearings 19 have wheels 22 thereon traveling on rails 23. These rails extend along each side of a soaking-pit furnace, the wall of which is indicated at 24. The rails 23 are carried on girders 25 resting on a suitable foundation 26. A gear motor 27 mounted on a supporting plate 28 drives one of the axles 21 through a chain and sprocket drive 29.

A bumper 30 of hexagonal shape in section, fabricated from plate, extends across each end of the cover, being mounted on plates 31 secured to the outer beams 15 and 17 and extending up over the end walls 12.

A lining of refractory brick is suspended within the side and end walls of the cover in the known manner. As shown in Figures 2 and 3, the body of the cover is at an elevation only slightly above that of the top of the walls of the soaking pit. Our invention provides means for sealing this space and also affords continuous water cooling for the sealing means. A sealing channel 32 extends along the sides and ends of the soaking pit near the top of the walls 24.

Angle plates 33 and 34 (see Figures 5 and 6) are secured to the upper edges of the end walls 11 and 12 and side walls 13 and 14. Fixed end curtains 35 and fixed side curtains 36 are secured to the horizontal flanges of the angle plates. One of the curtains 35 is shown in Figures 11 through 13. As there illustrated, it consists of a corrugated skirt or apron 37 having a channel 38 extending along the top thereof and welded thereto. Near the ends, vertical channels 39 are disposed between adjacent corrugations and slots 40 are formed in the flanges of the channel 38 between the flanges of the channels 39.

One of the fixed side curtains 36 is illustrated in Figures 8 through 10. It comprises a corrugated skirt or apron plate 41 having a channel 42 extending along on top thereof in somewhat the same manner as in the end curtains 35. The corrugations of the skirts 41, however, are substantially rectangular, as shown in Figure 8, instead of sinuous, as shown in Figure 11. The channel 42, furthermore, has a closure plate 43 secured to the flanges thereof and end plates at each end thereof. At one end of the duct thus formed is an extension 44 fabricated from plate and adapted to receive a water-supply pipe 45 extending into the outer end thereof. Guide angles 46 within the channel 42 prevent excessive deflection of the free end of the pipe 45 as the curtain 36 moves with the cover relative to the pipe 45 which is stationary. Only one of the curtains 36 is provided with an extension 44 but they are otherwise identical.

Slots 47 are formed in the lower flange of the channel 42 in alignment with alternate corrugations of the skirt 41 near opposite ends of the curtain 36. Plates 48 are welded across the open side of the corrugations in alignment with the slots, thus providing vertical passages through which water supplied to the channel 42 by the pipe 45 may flow downwardly through the open bottoms of the closed-in corrugations.

As shown in Figures 1, 4 and 7, the skirts 37 of the end curtains abut the skirts 41 of the side curtains, thereby providing a continuous flange or skirt depending from the angle plates 33 and 34, extending entirely around the sides and ends of the cover.

A curtain 49 suspended from the cover for vertical movement relative to the curtains 35 and 36, has the form of a deep trough into which the latter depend. A sealing flange or strip 50 welded to the bottom of the trough 49 is adapted to penetrate granular sealing material, such as sand 51, in the sealing channel 32 extending around the walls of the soaking pit. The trough 49 is continuous around the sides and ends of the cover being composed of side portions 52 and end portions 53 fabricated from suitable plate. As shown in Figures 14 through 17, the end portions 53 have the right angle bends of the trough formed therein so that the complete movable curtain may be assembled by disposing two side portions 52 between two spaced end portions 53 and welding them together as at 54 in Figure 7.

The complete trough 49 is suspended on hanger rods 55 extending through holes in the angle plates 33 aligned with the slots 40 in the channels of the fixed end curtains. Pins 56 extending through holes in the sides of the trough 49 near the bottom thereof pass through eyes at the lower ends of the rods 55. The rods 55 hang from chains 57 secured to and trained around pulley segments 58 secured to shafts 59. The shafts 59 are journaled in bearings 60 mounted on the outer plates 31 and on cross members 61 extending between the inner plates 31. As shown in Figures 1 and 2, the shafts 59 are disposed adjacent the ends of the cover. Counterweights 62 are mounted on crank arms 63 secured to the shafts. Crank arms 64 are connected by pull rods 65 to crank shaft 66. One end of the crank shaft is journaled in a bearing 67. The other end is secured to the output shaft of a gear motor 68. The gear motor is mounted on a base 69 carried on the cross-beams 16. It will be apparent that operation of the gear motor to cause the crank shaft to turn through 180° will swing the shafts 59 and segments 58 in such directions as to lower the trough 49 so that its flange 50 will penetrate the sand 51 in the sealing channel 32. Continued rotation of the crank shaft through another 180°, of course, will restore the trough 49 to the position in which it is illustrated in Figures 2 and 3.

Channels 70 extend along the outer walls of the trough 49 at the ends of the cover being welded thereto adjacent their upper edges. Similar channels 71 extend along and are secured to the outer walls of the trough along the sides of the cover. The channels 70 and 71 provide a continuous overflow duct. The end channels 70, as shown in Figure 17, have their bottom flanges sloping downwardly from the center toward each side. The side channels 71, as shown in Figure 15, have their bottom flanges sloping downwardly from the ends towards the middle. It will be evident that when the trough 49 is filled to the level of its outer wall, water will overflow into the channels 70 and 71. As previously explained, water is supplied to the trough 49 along one side of the cover through the extension 44 of one of the fixed curtains 36. The upper edge of the outer wall of the trough 49 is preferably slightly higher, e. g., ½", on the side on which the water is supplied than on the opposite side, thus tending to maintain a continuous flow through the trough from the side on which the water is supplied through the end portions of the trough to the opposite side. Holes 72 at about the midpoints of the channels 71 provide outlets for water flowing over the outer walls of the trough and into the duct formed by the channels 70 and 71. A downwardly sloping lip 73 forms the bottom edge of each hole 72 and serves to direct the water into one of a pair of gutters 74.

One of the gutters 74 is shown in Figures 18 and 19. These gutters extend along inside the girders 25 having clips 76 welded thereto adapted to hook over supporting bars 77 extending between spaced vertical plates 78 welded to the flanges and webs of the girders. The bottoms of the girders slope downwardly toward a discharge connection 79, the ends of the gutters being closed by suitable crosswalls 80. The length of the gutters is such that they will receive water flowing from the outlet holes 71 in any position of the cover between its extreme open and closed positions.

Figures 20 through 22 illustrate the mounting of the pipe 45 projecting through a hole in the end of the extension 44 from one of the fixed side curtains 36. As there illustrated, the pipe 45 is threaded into a block 81 which is vertically adjustable in a housing 82 extending from one end of the girder 25 normal thereto. The housing 82 has a vertical slot 83 to permit vertical adjustment of the block 81 and the pipe 45. A threaded stud 84 is welded to the block 81 so that the block may be adjusted vertically by means of a nut threaded on the stud. A supply pipe 85 is threaded into the lower face of the block 81 and the latter has intersecting bores to provide communication between the pipes 85 and 45. The pipe 85 is connected to a water-supply system through a flexible tube, such as a piece of rubber hose.

It will be understood that the trough 49 and the fixed end and side curtains 35 and 36 are so dimensioned that the sealing flange or strip 50 at the bottom of the trough will penetrate the sand 51 in the sealing channel 32 before the level of the water in the trough breaks sealing engagement with the bottom edges of the fixed curtains as the trough is lowered. In other words, the fixed and movable curtains provide a liquid seal which is "made" at all times. This seal is extensible by lowering the trough or movable curtains to cause the flange 50 to penetrate the sand in the channel 32. That is to say, the seal provided by the flange 50 and the sand in the channel 32 is "made" when the cover is in position over the pit and is broken by raising the trough when it is desired to move the cover to open position.

It will be apparent from the foregoing description that our invention provides sealing means for a soaking-pit cover which is less subject to blowing out of the sand and channeling than similar seals known previously. We have also improved on the latter by providing a continuous flow of water through the trough, thus tending to cool it below the temperature at which overheating or burning thereof occurs. Cooling water is supplied constantly to the trough through one of the fixed side curtains by the telescoping pipe 45 in all positions of the cover. Similarly, the overflow of water from the trough is collected in the gutters at all positions of the cover. The corrugated skirts of the fixed side and end curtains limit surging of the water in the trough on acceleration or deceleration of the cover. The water seal afforded by the fixed and movable curtains maintains itself automatically so long as water is supplied continuously through the duct from the upper portion of one of the fixed side curtains and no special attention need therefore be given to it during normal operations. The sealing flange on the bottom of the trough affords a good seal when lowered into the sand in the sealing channel 32. The cooling of the sealing flange afforded by the flow of water through the trough 49 prevents burning even if channeling occurs in the sealing sand.

Although we have illustrated and described but a preferred embodiment of our invention, it will be understood that changes in the construction and details of the various parts may be made within the spirit of the invention and the scope of the appended claims.

We claim:

1. Sealing means for closing the space between the wall of a furnace chamber and a cover therefor, said means comprising a channel extending around the chamber, a curtain in the form of a trough extending peripherally of the cover and depending therefrom, movable vertically relative to the cover and adapted to receive a sealing liquid, a curtain fixed on and extending peripherally of the cover and depending into said trough, and means for raising and lowering said movable curtain, said movable curtain being adapted when lowered, to establish sealing relation with said channel before said fixed curtain breaks sealing relation with the liquid in said trough.

2. The apparatus defined by claim 1 characterized by an overflow duct extending around said trough and an outlet from said duct, said duct draining to said outlet.

3. Sealing means for closing the space between the wall of a furnace chamber and a cover therefor, rectangular in plan and movable parallel to its sides from a position over the chamber to a position laterally thereof, said means comprising a channel extending around said chamber, a curtain in the form of a trough extending peripherally of the cover and depending therefrom, movable vertically relative to the cover and adapted to receive a sealing liquid, a curtain fixed on and extending peripherally of the cover and depending into said trough, means for raising and lowering said movable curtain, said movable curtain being adapted when lowered, to establish sealing relation with said channel before said fixed curtain breaks sealing relation with the liquid in said trough, an overflow duct extending around said trough, an outlet for said duct on at least one of said sides, and a gutter extending below the path of said outlet adapted to collect liquid flowing therefrom.

4. Sealing means for closing the space between the wall of a furnace chamber and a cover therefor, rectangular in plan and movable parallel to its sides from a position over the chamber to a position laterally thereof, said means comprising a channel extending around the chamber, a curtain in the form of a trough extending peripherally of the cover and depending therefrom, movable vertically relative to the cover and adapted to receive a sealing liquid, a curtain fixed on and extending peripherally of the cover and depending into said trough, means for raising and lowering said movable curtain, said movable curtain being adapted when lowered, to establish sealing relation with said channel before said fixed curtain breaks sealing relation with the liquid in said trough, a liquid-supply conduit extending along one side of the cover above said trough, and a pipe connection from a liquid source telescoping into said conduit.

5. Sealing means for closing the space between the wall of a furnace chamber and a cover therefor, said means comprising a channel extending around the chamber, a curtain in the form of a trough extending peripherally of the cover and depending therefrom, movable vertically relative to the cover and adapted to receive a sealing liquid, a fixed curtain extending peripherally of the cover and depending into said trough, and means for raising and lowering said movable curtain, said movable curtain having a skirt around its lower edge adapted, when the movable curtain is lowered, to establish sealing relation with said channel before said fixed curtain breaks sealing relation with the liquid in said trough.

6. Sealing means for closing the space between the wall of a furnace chamber and a cover therefor, rectangular in plan and movable parallel to its sides from a position over the chamber to a position laterally thereof, said means comprising a channel extending around the chamber, a curtain in the form of a trough extending peripherally of the cover and depending therefrom, movable vertically relative to the cover and adapted to receive a sealing liquid, a curtain fixed on and extending peripherally of the cover and depending into said trough, means for raising and lowering said movable curtain, said movable curtain being adapted when lowered, to establish sealing relation with said channel before said fixed curtain breaks sealing relation with the liquid in said trough, an overflow duct extending around said trough, and an outlet for said duct on each of said sides, the portions of the duct along the ends of the cover sloping from an intermediate point toward said sides.

7. The apparatus defined by claim 1 characterized by an overflow channel extending along the outer edge of said trough, adapted to receive liquid therefrom at points spaced therealong, and an outlet from said channel.

8. In a soaking-pit cover, rectangular in plan and movable parallel to its sides, a trough extending around the cover, movable vertically relative to the cover and depending therefrom adapted to receive a sealing liquid, means for raising and lowering said trough, and a curtain fixed on and extending peripherally of the cover and depending therefrom into said trough, said trough being adapted when lowered to establish sealing relation with a channel around a soaking pit before said curtain breaks sealing relation with the liquid in the trough.

9. The apparatus defined by claim 8 characterized by an overflow channel extending around the cover below the outer edge of the trough adapted to receive liquid flowing over said edge, and an outlet from said overflow channel on each side of the cover.

10. The apparatus defined by claim 8 characterized by an overflow channel extending around said trough, an outlet from said overflow channel on each side of the cover, and gutters extending below the paths of said outlets.

11. The apparatus defined by claim 1 characterized by said fixed curtain having vertical corrugations to prevent surging of the liquid in said trough on movement of the cover.

12. The apparatus defined by claim 8 characterized by said curtain having vertical corrugations along the sides of the cover, at least, to prevent surging of the liquid in said trough on movement of the cover.

13. The apparatus defined by claim 8 characterized by said trough having a depending flange extending around its bottom adapted to engage a sealing medium in said channel.

14. Means for sealing the space between the edges of a pit-furnace mouth and a cover movable thereover, said means being adapted to cooperate with a channel extending around the opening and comprising a curtain mounted on the cover for vertical movement, said curtain including a trough having a bottom portion adapted to penetrate sealing material in said channel, means for supplying water to said trough, a second curtain depending into said trough, means closing the space between said second curtain and the cover, an outlet for water overflowing the outer side of said trough and a gutter extending along below the path of said outlet.

OSCAR M. FOX.
WILLIAM R. BOYER.